United States Patent

Jain

Patent Number: 5,232,474
Date of Patent: Aug. 3, 1993

[54] PRE-PURIFICATION OF AIR FOR SEPARATION

[75] Inventor: Ravi Jain, Piscataway, N.J.

[73] Assignee: The BOC Group, Inc., New Providence, N.J.

[21] Appl. No.: 779,427

[22] Filed: Oct. 17, 1991

Related U.S. Application Data

[63] Continuation-in-part of Ser. No. 513,340, Apr. 20, 1990, abandoned.

[51] Int. Cl.⁵ .............................................. B01D 53/04
[52] U.S. Cl. ............................................ 55/26; 55/33; 55/58; 55/62; 55/68; 55/74; 55/75
[58] Field of Search ................... 55/25, 26, 31, 33, 62, 55/68, 74, 75, 58; 62/13, 18

[56] References Cited

U.S. PATENT DOCUMENTS

| | | | |
|---|---|---|---|
| 2,910,139 | 10/1959 | Matyear, Jr. ............ | 55/31 X |
| 3,533,221 | 10/1970 | Tamura .................. | 55/33 |
| 3,738,084 | 6/1973 | Simonet et al. .......... | 55/31 |
| 3,923,477 | 12/1975 | Armond et al. ......... | 55/58 X |
| 3,957,463 | 5/1976 | Drissel et al. ........... | 55/25 |
| 4,013,429 | 3/1977 | Sircar et al. ............ | 55/33 |
| 4,194,891 | 3/1980 | Earls et al. .............. | 55/26 |
| 4,203,958 | 5/1980 | Snarski ................... | 55/25 X |
| 4,264,340 | 4/1981 | Sircar et al. ............ | 55/31 X |
| 4,329,158 | 5/1982 | Sircar ..................... | 55/33 X |
| 4,477,264 | 10/1984 | Kratz et al. ............. | 55/31 X |
| 4,499,208 | 2/1985 | Fuderer .................. | 55/25 X |
| 4,539,019 | 9/1985 | Koch ...................... | 55/31 X |
| 4,627,856 | 12/1986 | von Gemmingen ..... | 55/31 |
| 4,636,225 | 1/1987 | Klein et al. ............. | 55/31 |
| 4,711,645 | 12/1987 | Kumar .................... | 55/31 X |
| 4,731,102 | 3/1988 | Yoshino .................. | 62/18 X |
| 4,746,343 | 5/1988 | Ishizu et al. ............ | 62/18 X |
| 4,756,723 | 7/1988 | Sircar ..................... | 55/31 X |
| 4,806,136 | 2/1989 | Kiersz et al. ............ | 62/18 |
| 4,813,977 | 3/1989 | Schmidt et al. ......... | 55/31 X |
| 4,892,565 | 1/1990 | Schmidt et al. ......... | 55/31 X |
| 4,957,523 | 9/1990 | Zarate et al. ............ | 62/18 X |
| 4,986,835 | 1/1991 | Uno et al. ............... | 55/33 X |

*Primary Examiner*—Robert Spitzer
*Attorney, Agent, or Firm*—Coleman R. Reap; Larry R. Cassett

[57] ABSTRACT

Carbon dioxide is removed from a gas stream containing at least 250 ppm by volume of carbon dioxide by pressure swing adsorption in an alumina adsorption bed that is sized sufficiently large to remove at least 75 mole percent of the carbon dioxide in the gas stream. The process is particularly useful for removing substantially all of the carbon dioxide and water vapor from a stream of ambient air prior to separating the components of the air in a cryogenic air separation unit.

17 Claims, 1 Drawing Sheet

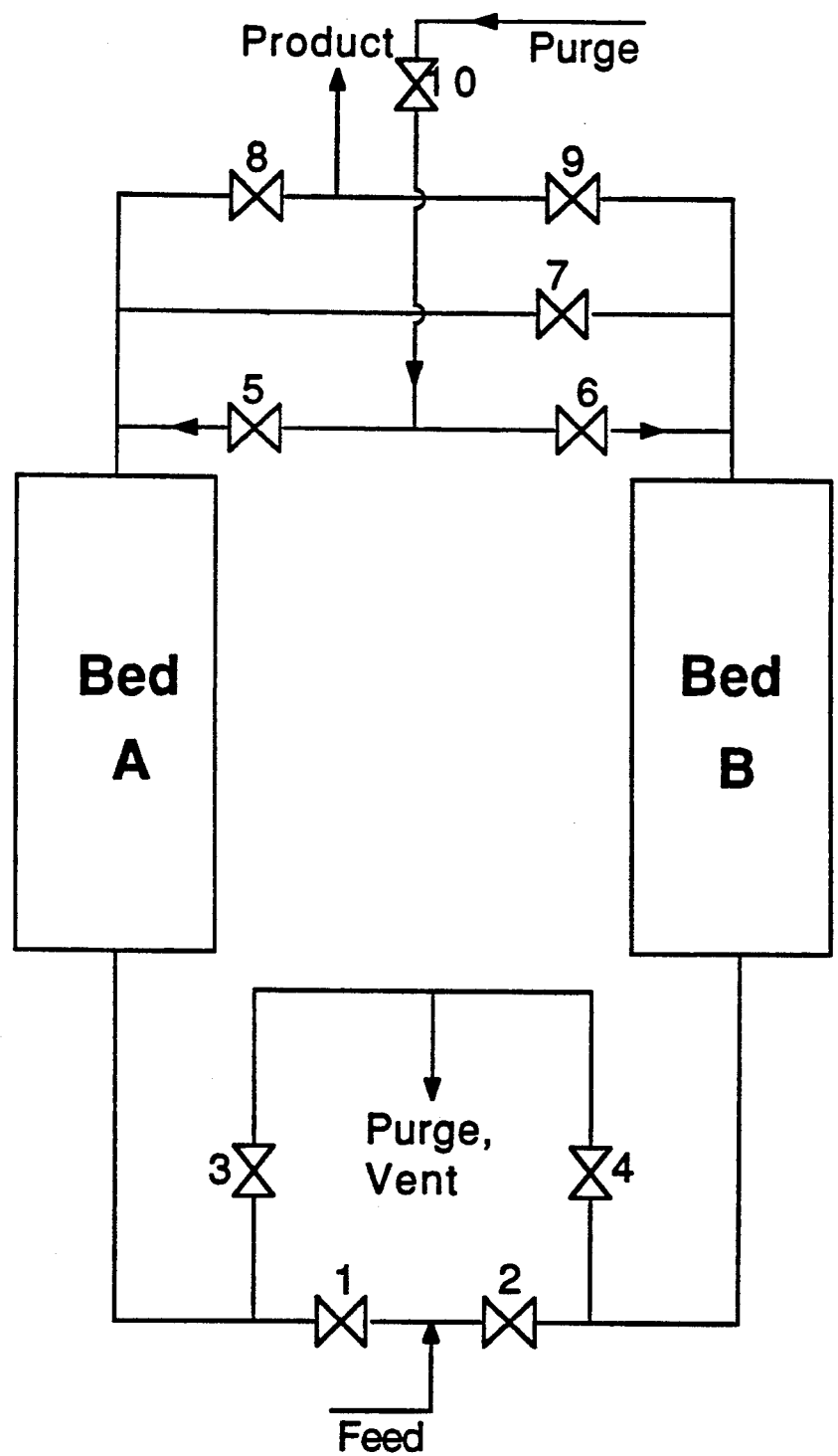

PRE-PURIFICATION OF AIR FOR SEPARATION

This is a continuation-in part of U.S. patent application Ser. No. 07/513,340, filed Apr. 20, 1990, now abandoned.

BACKGROUND OF THE INVENTION

1. Field of the Invention

This invention relates to the removal of impurities from a gas stream, and more particularly to the removal of carbon dioxide from a gas stream. The invention is particularly applicable to the removal of carbon dioxide from an ambient air stream prior to introduction of the air stream into a conventional cryogenic air separation unit.

It is often desirable or necessary to remove certain impurities, such as carbon dioxide and moisture, in the form of water vapor, from a gas stream prior to further processing of the gas stream. For example, conventional air separation units (ASUs) for the production of nitrogen and oxygen by the cryogenic separation of air are basically comprised of a two-stage distillation column which operates at very low temperatures. Due to the extremely low temperatures, it is essential that water vapor and carbon dioxide be removed from the compressed air feed to an ASU. If this is not done, the low temperature sections of the ASU will freeze up making it necessary to halt production and warm the clogged sections to revaporize and remove the offending solid mass of frozen gases. This can be very costly. It is generally recognized that, in order to prevent freeze up of an ASU, the content of water vapor and carbon dioxide in the compressed air feed stream must be less than 0.1 ppm and 1.0 ppm, respectively.

A process and apparatus for the pre-purification of a gas must have the capacity to constantly meet, and hopefully exceed, the above levels of contamination and must do so in an efficient manner. This is particularly significant since the cost of the pre-purification is added directly to the cost of the product gases of the ASU.

2. Description of the Relevant Prior Art

Current commercial methods for the pre-purification of gases include reversing heat exchangers, temperature swing adsorption and pressure swing adsorption. The first two of these approaches are described by Wilson et al. in IOMA BROADCASTER, Jan.-Feb., 1984, pp 15-20.

Reversing heat exchangers remove water vapor and carbon dioxide by alternately freezing and evaporating them in their passages. Such systems require a large amount, i.e. 50% or more, of product gas for the cleaning, i.e. regenerating, of their passages. As a result of this significant disadvantage, combined with characteristic mechanical and noise problems, the use of reversing heat exchangers as a means of pre-purification has steadily declined over recent years.

In temperature swing adsorption (TSA) pre-purification, the impurities are removed at low temperature, typically at about 5° C., and regeneration is carried out at elevated temperatures, e.g. from about 150° C.-250° C. The amount of product gas required for regeneration is typically only about 12%-15%, a considerable improvement over reversing heat exchangers. However, TSA processes require both refrigeration units to chill the feed gas and heating units to heat the regeneration gas. They are, therefore, disadvantageous both in terms of capital costs and energy consumption.

Pressure swing adsorption (PSA) processes are an attractive alternative to TSA since both adsorption and regeneration are carried out at ambient temperature. PSA processes, in general, do require substantially more regeneration gas than TSA which can be disadvantageous when high recovery of cyrogenically separated products is desired. This disadvantage can be substantially reduced, however, in a cryogenic plant which has a substantial waste stream, e.g. about 40% of the feed. Such streams are ideal as regeneration gas since they are impurity free, i.e. free of water vapor and carbon dioxide, and would be vented in any event. However, although many pre-purification methodologies based on PSA have been proposed in the literature, few are actually being used commercially due to high capital and energy costs associated therewith.

German Patent Publication DE 3,045,451 (1981) describes a PSA pre-purification process which operates at 5°-10° C., 880 KPa (9 Kg/cm$^2$) adsorption pressure and 98 KPa (1 atm) regeneration pressure. Feed air is passed under pressure through a layer of 13X zeolite particles to remove the bulk of water vapor and carbon dioxide and then through a layer of activated alumina particles to remove the remaining low concentrations of carbon dioxide and water vapor. It is stated that the secondary layer of activated alumina can comprise from about 20%-80% of the combined volume of the bed. The arrangement of the adsorbent layers in this manner is claimed to reduce the formation of "cold spots" in the adsorbent beds.

A process similar to that of this German Patent Publication is discussed by Tomomura et al in KAGAKU KOGAKU RONBUNSHU. 13(5), (1987), pp 548-553. This latter process operates at 28°-35° C., 0.65 MPa adsorption pressure, and 0.11 MPa regeneration pressure, has a sieve specific product of 7.1 Sm$^3$/min/m$^3$ of sieve and a vent gas loss of 6.3% of the feed air. This is the amount of additional air that would have to be compressed to make up for the vent gas loss. While 6.3% would appear to be a relatively low number, each one percent by volume of feed air lost in the vent represents, on the average, an annual operating loss of ten thousand dollars for a plant producing two hundred tons of nitrogen per day.

Japanese Kokai Patent Publication Sho 59-4414 (1984) describes a PSA pre-purification process in which separate beds and adsorbents are used for water vapor and carbon dioxide removal. The water vapor removal tower containing activated alumina or silica gel is regenerated by low pressure purge while the carbon dioxide removal tower containing 13X zeolite is regenerated by evacuation only without a purge. This process requires about 25% regeneration gas and, as a result, would be used with regard to cryogenic processes having a high product recovery. However, where the cryogenic plant produces a substantial waste stream, such processes are expensive because of the power demands of the vacuum pump.

Japanese Patent Publication Sho 57-99316 (1982) describes a process wherein feed air, vent gas and purge gas are passed through a heat exchanger to thereby cause adsorption and desorption to take place at nearly the same temperature. The advantage of this process is stated to be a reduction in the required quantity of regeneration gas.

In the process described in Japanese Patent Publication Sho 55-95079 (1980), air is treated by PSA in two stages to remove water vapor and carbon dioxide wherein dry air product from the PSA unit is used to purge the first stage and an impure nitrogen stream from the ASU is used to purge the second stage. This process is stated to be advantageous in terms of the overall nitrogen recovery.

U.S. Pat. No. 4,711,645 describes a pre-purification PSA process utilizing activated alumina for removal of water vapor and a zeolite for carbon dioxide removal. It is stated that the use of activated alumina for water removal allows adsorption at a lower temperature and, therefore, carbon dioxide adsorption takes place at a lower temperature. Both adsorption and desorption take place at close to ambient temperature.

In the PSA cycle described in laid-open German Offen. DE 3,702,190 A1 (1988), at least 80% of the heat of adsorption is retained in the bed and is available for regeneration. The process of this patent document includes the use of initial bed of silica gel or alumina for moisture removal and a second bed of 13X zeolite for carbon dioxide removal. The principle of retaining heat of adsorption in PSA beds is well established in the art.

Most of the prior art PSA air purification processes, with the exception of the German Patent Publication DE 3,045,451, utilize an initial bed or layer containing activated alumina or silica gel for water vapor removal and then a zeolite bed or layer for carbon dioxide removal. German Patent Publication DE 3,045,451 utilizes zeolite particles to adsorb the bulk of the water vapor and carbon dioxide present and then utilizes a layer of activated alumina to remove low concentrations of both impurities that remain from the first bed.

In accordance with the present invention, a means of efficiently removing water vapor and carbon dioxide has been found which is advantageous over the prior art in terms of power consumption and vent gas loss.

SUMMARY OF THE INVENTION

Carbon dioxide and water vapor (if present) are removed from a gas stream, such as ambient air, by pressure swing adsorption (PSA) by passage of the gas stream at a superatmospheric pressure through an adsorption zone comprised of activated alumina. The adsorption zone is sized sufficiently large to adsorb at least 75 percent of the carbon dioxide in the gas stream. Upon saturation of the adsorption zone with these impurities, the zone is depressurized and purged with a gas which contains very little or no carbon dioxide or moisture, such as the nonadsorbed gaseous effluent from the adsorption zone.

The activated alumina adsorption zone is preferably sufficiently large to remove at least 90 percent of the carbon dioxide from the gas stream, and is most preferably large enough to remove substantially all of the carbon dioxide therefrom.

The gaseous effluent from the activated alumina adsorption zone may be passed through a second adsorption zone containing a zeolite, such as 13X zeolite, to remove residual carbon dioxide or other impurities, such as hydrocarbons, from the gas stream.

In a preferred embodiment, the adsorbent particles, particularly the zeolite particles, when the system contains a zeolite bed, are smaller than adsorbent particles conventionally used in PSA gas separations. In another preferred embodiment, the gas flow pattern comprises flowing the feed gas stream through the adsorption bed cocurrently, i.e. through the bed in the direction from the feed gas inlet to the unadsorbed product outlet, and flowing all other gas streams through the bed counter-currently. In the most preferred flow pattern, the feed gas flows vertically upward through the adsorption bed and all other gas streams flow vertically downward through the bed. This flow pattern minimizes the tendency of the bed to fluidize, even with the smaller particles used in the preferred embodiment.

BRIEF DESCRIPTION OF THE DRAWING

The invention will be more clearly understood by reference to the drawing which is a schematic flow diagram of a pressure swing adsorption pre-purification system according to the present invention.

DETAILED DESCRIPTION OF THE INVENTION

The present invention relates to an improved PSA process for the removal of carbon dioxide from a gas stream by the passage of the gas stream through a bed of activated alumina. The invention can be used to remove a part, or substantially all, of the carbon dioxide contained in gas streams. The size of the bed used in the process of the invention will depend upon the amount of carbon dioxide contained in the gas stream. In treating gas streams that contain carbon dioxide in small concentrations, e.g. up to about 250 parts per million (ppm) carbon dioxide, small beds can be efficiently used to remove substantially all of the carbon dioxide contained in the gas stream. Gas streams that contain higher concentrations of carbon dioxide, e.g. concentrations greater than about 250 ppm, are treated in larger sized beds of activated alumina. The adsorption bed is preferably designed to remove at least about 75%, and most preferably at least about 90% of the carbon dioxide contained in the gas stream. In the most preferred embodiment of the invention, the adsorption bed is designed to adsorb substantially all of the carbon dioxide contained in the bed. In the description and the appended claims, percentages, ratios and parts, including ppm, are expressed on a volume basis.

The term "activated alumina" as used herein refers to such materials as are commercially available. Those skilled in the art are aware that such materials typically are not 100% alumina and will contain small percentages of other materials, such as ferric oxide, sodium oxide, silica and the like. Certain commercially available activated alumina products are even formulated to contain specified amounts of these and other materials to enhance their activity or confer other beneficial properties thereto. An example of a specially formulated activated alumina is a product manufactured by Alcoa, Inc., Pittsburgh, Pa. under the designation product code H-152. In contrast to conventional activated alumina which typically contains less than 1% of silica, this material contains about 10% by weight of silica on a particulate basis, i.e. each particle contains silica as opposed to the product being a heterogeneous particulate mixture. All of the above products can be used in the process of the invention.

Although activated alumina is conventionally utilized to remove water vapor from air in pre-purification units, its use heretofore has been primarily as an initial layer or bed to remove water vapor, and it is generally followed by a second layer of an adsorbent, such as zeolite, to remove carbon dioxide. German Publication DE 3,045,451, discussed above, discloses the use of the adsorbents in reverse order and states that the activated alumina is utilized only as a second layer to remove low concentrations of impurities which pass the initial layer of zeolite.

The use of activated alumina to remove substantial amounts of carbon dioxide is contrary to the teachings of the prior art, which recognizes its use only for removing moisture from gas streams. Activated alumina has, at most, only one-fifth the absolute capacity of 13X zeolite for carbon dioxide adsorption; however activated alumina has the advantage over 13X zeolite that it can be essentially completely regenerated in PSA processes whereas 13X zeolite is only partially regenerated. The effective carbon dioxide capacity (the difference between adsorption and regeneration step loadings) for activated alumina is at least as high as 13X zeolite, i.e. activated alumina is at least as efficient for carbon dioxide removal from gas streams by PSA as is 13X zeolite.

Activated alumina has an additional advantage over zeolites for the adsorption of carbon dioxide from air in that it adsorbs significantly less air than do zeolites. Experiments carried out at a pressure of 0.97 MPa (140 psia) and 25° C. suggest that a unit volume of 13X zeolite adsorbs about three times as much air as a comparable unit volume of activated alumina. Therefore, the use of activated alumina instead of zeolites for the adsorption of carbon dioxide results in a reduction in the vent gas loss of 50% or more, which represents a considerable savings in energy consumed.

The use of activated alumina instead of zeolite for the adsorption of all or most of the carbon dioxide has the added advantage of substantially eliminating the "cold zone" that often forms in zeolite-containing beds during desorption. As mentioned above, zeolites adsorb a substantially larger quantity of air than does activated alumina during the production stage of a PSA cycle. Also, the heat of adsorption of components on zeolites is greater than on activated alumina. During the desorption or regeneration stage of zeolites, adsorbed gas is very rapidly desorbed in an adiabatic manner, thus creating an acute drop in temperature. FIG. 3 of German Patent Publication DE 3,045,451 shows that a temperature drop of about 20° C. in the zeolite layer during desorption is possible for adsorption at 10° C. German Offen. DE 3,702,290 A1 discloses that, in a process utilizing activated alumina or silica gel for water vapor removal and 13X zeolite for carbon dioxide removal, desorption takes place at about 30° C. lower than adsorption. This, again, is due to the formation of the cold zone during rapid desorption.

When desorption occurs at a temperature much lower than adsorption, the amount of regeneration gas required for desorption is much higher than when desorption and adsorption occur at nearly the same temperature. A large temperature difference between adsorption and desorption also leads to inefficient regeneration of the adsorbent bed, thereby requiring the use of larger amounts of adsorbents. In addition, the effect of the "cold zone" becomes more severe with time and it can both increase in size and move within the bed. All of these factors can lead to operational instabilities. It will be appreciated by those skilled in the art that, because of the factors cited above, the sharp drop in temperature associated with the use of zeolite is undesirable both in terms of cost and operational considerations.

As mentioned above, it may sometimes be desirable to include a second adsorption zone containing particles of zeolites in the system of the invention. The second adsorption zone may contain any of the various zeolites. 13X zeolite is particularly preferred for use in this zone.

The second adsorption zone serves the purpose of removing other gaseous impurities, such as hydrocarbons from the gas stream being treated. The second adsorption zone can also serve to remove residual carbon dioxide from the gas stream exiting the activated alumina bed. However, because of the above-noted advantages of using activated alumina for this purpose, the zeolite-containing adsorption zone is not intended to remove large amounts of carbon dioxide from the gas stream. The zeolite adsorption zone will, of course, be located downstream from the activated alumina adsorption zone.

In embodiments of Applicant's process in which zones of different adsorbents are utilized, the two zones may be in separate vessels or in a single vessel with a suitable barrier between them to prevent comingling. A single vessel is preferred because of the lower capital cost involved in using such.

According to a preferred embodiment, the size of the particles of adsorbent, particularly the size of the particles of zeolite, when the system contains a zeolite adsorption zone, utilized in the process of the present invention is smaller than is conventionally utilized in PSA processes. Preferably, the particles of adsorbent in the beds are not larger than about two mm. Specifically, the particle size of the adsorbent used is smaller than about two mm, preferably from about 0.4 to 1.8 mm, and most preferably, from about 0.6 mm to 1.6 mm. Experiments carried out at 23° C. and 724 KPa (105 psia) utilizing an adsorbent bed containing 75% by volume of a first adsorbent layer of commercial 3.0 mm activated alumina and the remainder a second layer of 0.4–0.8 mm 13X zeolite gave a sieve specific product of 28.5 $Sm^3/min/m^3$ of adsorbent and a vent gas loss of 1.7% of feed. The sieve specific product is approximately four times that produced by the process described by Tomomura et al., discussed above, while the vent gas loss is less than about one-third of the vent gas loss in that process.

It is well known to those skilled in the art that smaller particles of adsorbent have smaller mass transfer zones which result in a more effective utilization of the bed in terms of its equilibrium capacity. Therefore, the use of finely particulate adsorbent in the subject process permits the use of smaller bed volumes. Reduction of the bed volume represents an immediate savings in capital costs for equipment as those skilled in the art will readily appreciate. Further, a reduced bed volume combined with the fact that the adsorbent utilized is activated alumina which adsorbs much less air than zeolite results in a significant reduction in vent gas loss during regeneration. Therefore, the present process can operate at a vent gas loss as low as 2–3% by volume, which represents less than one-half of the most efficient commercial process known to the Applicant. Viewed in terms of the value of a one percent vent gas loss given earlier, it is readily apparent that the process of this invention possesses significant economic advantages over currently used processes.

The PSA cycle of the present invention is specifically designed for adsorptive beds containing finely particulate adsorbent in that it does not have a conventional bed pressure equalization step. Therefore, the highest velocity gas flow encountered in a conventional PSA process is avoided. Further, in the preferred embodiment, the gas flow in all steps other than production is countercurrent to the direction of flow during the production step.

This is particularly advantageous when, as in the usual case, the adsorbent beds are vertically disposed and the feed stream flows upwardly through the beds. Since the upward flow during production is fairly steady, beds can be easily designed to prevent fluidization during production. In the present invention the gas flow in the higher flow velocity steps (such as pressurization) will be downward and fluidization is generally not a problem for downward flow steps. Furthermore, conventional bed design techniques can be used to minimize attrition of adsorbent particles in downward flow. Those skilled in the art will appreciate that the subject PSA process substantially avoids abrupt shifting of the particles of adsorbent in the adsorptive bed, thereby preventing fluidizing of the bed and the resulting adsorbent degradation. The subject process, therefore, permits the use of finely particulate adsorbent with the advantages previously stated.

As is clear from the foregoing, the invention can be used to remove carbon dioxide (and moisture, if any is present) from any gas stream. However, to simplify the description, the invention will be described in particular detail as it applies to the removal of carbon dioxide from an ambient air stream. The term "ambient air", as used in the description and appended claims, means air that contains at least 250 ppm carbon dioxide and up to the saturation amount of moisture in the form of water vapor.

Turning to the Figure, feed gas, e.g. air, typically at a pressure of about 517 KPa (75 psia) to about 1.14 MPa (165 psia), is admitted alternately to adsorptive beds A and B by the opening and closing of valves 1 and 2. Beds A and B operate out of phase so that one is producing while the other is undergoing regeneration. While the invention is described with regard to a pair of adsorptive beds A and B, it can be carried out in a single bed or with three or more beds operating out of phase or with multiple pairs of beds, as is recognized by those skilled in the art. Furthermore, the activated alumina may be contained in a single bed or in two or more serially connected beds.

When Bed A is in the production step of the cycle, valve 1 is open, valves 2 and 3 are closed and air is being forced through the particulate adsorbent contained therein under pressure. Valves 5, 7 and 9 are also closed and valve 8 opened so that air substantially free of water vapor and carbon dioxide flows out of the system through the line marked "product". The product stream, which contains less than 0.1 ppm of water vapor and 1.0 ppm of carbon dioxide can be introduced into a cryogenic air separation unit (ASU), not shown.

At the completion of the production step of the cycle, valve 7 is opened to repressurize Bed B by backfilling from Bed A, then valves 1 and 8 are closed and valve 3 opened to allow Bed A to vent to the atmosphere. The length of the production cycle is a time such that a front of impurities does not flow out of the adsorptive beds, i.e. the beds have not reached their adsorptive capacity. This is readily determined by conventional procedures well known to those of ordinary skill in the art. The determination and adjustment of the production step automatically with reference to the water vapor and carbon dioxide content of the incoming air feed using conventional sensing and regulating apparatus is likewise well known to those of ordinary skill in the art. It is a distinct advantage of the subject process that the amount of gas lost to the atmosphere during the venting step represents less than three percent of the volume of feed gas.

At the conclusion of the venting step, valves 5 and 10 are opened and purge gas is admitted to Bed A countercurrent to the flow therethrough during production. The purge exits the bed through the open valve 3. The purge gas is any gas which is at or below the levels of water vapor and carbon dioxide in the product gas of the PSA system. This can be a product gas of the ASU or, preferably, a high nitrogen content waste gas which is readily available under pressure. The purge step is of sufficient duration to desorb the adsorbed impurities and remove them from the bed. The statements made above concerning the monitoring and determining of the production step apply equally to the purge step.

At the conclusion of the purge step, valves 3, 5 and 10 are closed and valve 7 opened to repressurize Bed A by backfilling with product gas being produced in Bed B. During the backfill step, valve 9 remains open and product gas from Bed B continues to be withdrawn from the system.

Upon the completion of the backfill step, valve 7 is closed and valves 1 and 8 opened to begin another cycle. Bed B is operating out of phase with Bed A so that one is undergoing regeneration, i.e. venting and purging, while the other is producing product. A typical cycle for a two-bed system is shown in the Table I.

TABLE I

Typical PSA Cycle (20 Minute Cycle)

| Bed A | Valves Open | Bed B | Time (Sec.) |
|---|---|---|---|
| Backfill from Bed B | 2, 7, 9 | Produce, backfill Bed A | 60 |
| Produce | 1, 4, 8 | Vent to Atmosphere | 30 |
| Produce | 1, 4, 6, 8, 10 | Purge | 510 |
| Produce, backfill Bed B | 1, 7, 8 | Backfill from Bed A | 60 |
| Vent to Atmosphere | 2, 3, 9 | Produce | 30 |
| Purge | 2, 3, 5, 9, 10 | Produce | 510 |

The PSA cycle of this invention has been shown to be particularly advantageous for the finely particulate adsorbent in the adsorptive beds as described above. Certain modifications of the process described with reference to the Figure may be made without departing from the scope of the subject invention. For example, both the purge and vent steps can be carried out under vacuum using conventional equipment. Also, if desired, repressurization of the beds can be carried out using feed gas instead of product gas. Overall, the subject process provides a significant improvement in prepurification of air for an ASU in terms of capital cost and efficiency of operation.

The following Examples further illustrate this invention, it being understood that the invention is in no way intended to be limited to the details described therein.

EXAMPLES 1 to 5

Air was purified to remove water vapor and carbon dioxide utilizing an apparatus as shown in the drawing, and a cycle as shown in Table I. The beds contained only an activated alumina commercially available from Alcoa, Inc., Pittsburgh, Pa. Each particle of this activated alumina (product code H-152) contains about 10% $SiO_2$ by weight. The particle size of the activated alumina was about 3.0 mm. The bed contained about 1.2 Kg (2.6 lb) of activated alumina per 100 mm of bed depth. The adsorption was carried out at a pressure of 965 KPa (140 psia) with water saturated air (at adsorption temperature) containing about 350 ppm carbon dioxide. The adsorption temperatures are given in Table II. The amounts of activated alumina needed to reduce the carbon dioxide content in the product to 1.0 ppm were experimentally determined through measurement of carbon dioxide concentration profiles in the bed and are given in Table II. The amounts of purge gas, vent gas loss and the sieve specific product are also given. The purge gas was nitrogen purified to remove water vapor and carbon dioxide.

TABLE II

| Ex. No. | Adsorp. Temp. (°C.) | Carbon Dioxide Conc. at 785 mm (ppm) | Purge as % of Feed | Vent Loss as % of Feed | Bed Height (mm) | Sieve Sp. Prod. (Sm³/min/m³) |
| --- | --- | --- | --- | --- | --- | --- |
| 1 | 32.5 | 55.0 | 45.0 | 1.98 | 1260 | 17.6 |
| 2 | 32.5 | 120.0 | 38.0 | 2.10 | 1360 | 16.4 |
| 3 | 32.5 | 160.0 | 30.0 | 2.43 | 1585 | 14.2 |
| 4 | 25.0 | 150.0 | 42.0 | 1.95 | 1340 | 17.5 |
| 5 | 25.0 | 63.0 | 30.0 | 2.35 | 1585 | 14.6 |

It can be seen that when only activated alumina is used to remove both carbon dioxide and water vapor, very low vent gas losses, as low as 2%, can be obtained which, as stated earlier, represent substantial power savings. Also purge amounts of as low as 30% of feed can be used. The sieve specific product for the all activated alumina design is over twice that of the commercial process described by Tomomura et al. and discussed above.

Temperature profile measurements for the all activated alumina design indicated a maximum temperature difference of less than 5° C. between the adsorption and desorption portions of the cycle. The cold zone formation was virtually eliminated because of the much smaller amount of air adsorbed on activated alumina as would be on zeolite. The improved adsorbent regeneration, due to the elimination of the cold zone, is partly responsible for the overall good performance.

EXAMPLES 6 AND 7

These examples illustrate the use of a second zeolite layer to remove residual carbon dioxide from the activated alumina layer. The experiments were carried out with two beds containing 9.3 Kg (20.6 lbs) of a commercially available activated alumina having an average particle size of 1.5 mm. The height of the activated alumina layer was 785 mm. The vessel contained a second layer of a commercially available 13X zeolite having an average particle size of about 1.5 mm. The amount of 13X zeolite used was about 0.94 Kg (2.1 lbs) per 100 mm of bed height. The carbon dioxide concentration profile in the bed was measured using an Infrared Analyzer and the amounts of 13X zeolite required to obtain 1.0 ppm carbon dioxide concentration at the vessel outlet were experimentally determined. The heights of the 13X zeolite layer and the volume % of 13X zeolite in the bed are given in Table III.

The adsorption was carried out at a pressure of 965 KPa (140 psia), a temperature of 32.5° C. with water saturated feed air containing about 350 ppm carbon dioxide. The PSA cycle and apparatus were as described with reference to Examples 1 to 5. The results of these experiments are reported in Table III.

TABLE III

| Ex. am. No. | Carbon Dioxide Conc. at 785 mm (ppm) | Purge as % of Feed | Vent Loss as % of Feed | Total Height (mm) | Activated Alumina Volume (%) | Sieve Sp. Prod. (Sm³/min/m³) |
| --- | --- | --- | --- | --- | --- | --- |
| 6 | 3.0 | 63.0 | 1.80 | 910.0 | 86.3 | 20.2 |
| 7 | 5.0 | 51.0 | 2.07 | 970.0 | 80.9 | 22.5 |

It can be seen that a substantial amount of carbon dioxide can be removed by activated alumina. In Examples 6 and 7, the amount of carbon dioxide was reduced from about 350 ppm to between 3 and 5 ppm in the activated alumina section alone. It can also be seen that as the amount of 13X zeolite in the bed is reduced (through the use of higher amounts of purge in these Examples), the amount of vent gas loss decreases. This is a direct result of higher amounts of air adsorbed in 13X zeolite sieve.

A further advantage of the present process can be seen by comparing Examples 1–3 with Examples 6–7. The carbon dioxide concentrations at 785 mm height in Examples 1–3 which use 3.0 mm activated alumina are between 55 and 160 ppm. Examples 6–7 which utilized 1.5 mm activated alumina, produced carbon dioxide levels of 3–5 ppm at the same bed height (785 mm). This significant difference is due to the shorter mass transfer zones associated with smaller particles.

EXAMPLE 8

Experiments were carried out with two beds containing 2.5 lbs. of a 7×12 mesh activited alumina per 100 mm of bed height. The adsorption was carried out at a pressure of 965 Kpa (140 psia), and at a temperature of 40° C., using water-saturated air containing about 350 ppm carbon dioxide as feed. The cycle used was the same as that shown in Table I and a purge amount of 40%, based on the feed, was utilized. The bed heights required to remove moisture and various amounts of $CO_2$ were experimentally determined by $CO_2$ concentration profile measurement and the results are tabulated in Table IV.

TABLE IV

| Species Removed | Percent Removed | Bed Height Required (mm) |
| --- | --- | --- |
| $H_2O$ | >99.99% (<1 ppm remaining) | 175 |
| $CO_2$ | 50% | 490 |
| $CO_2$ | 60% | 590 |
| $CO_2$ | 75% | 640 |
| $CO_2$ | 90% | 710 |
| $CO_2$ | 99% | 920 |
| $CO_2$ | 99.7% | 1,020 |

These experiments show that a substantially greater amount of activated alumina is required to remove $CO_2$ than $H_2O$. For example, for removal of 75% $CO_2$ and all of the water vapor from the feed, the amount of activated alumina required is more than 3.5 times the amount needed for removal of water vapor only. Thus, an activated alumina bed designed for $H_2O$ removal only, as in the prior art, will not remove substantial amounts of $CO_2$.

Although the invention has been described with particular reference to specific examples, the invention is not limited thereto.

The scope of the invention is limited only by the breadth of the appended claims.

I claim:

1. A process for the purification of a gas stream containing at least 250 ppm carbon dioxide by pressure swing adsorption comprising sequentially passing said gas stream through a bed of activated alumina at a superatmospheric pressure, thereby adsorbing substantially all of the carbon dioxide contained in the gas stream, depressurizing said bed and purging said bed with the gaseous effluent from said bed or with another gas that is substantially free of carbon dioxide, thereby desorbing carbon dioxide from said bed.

2. The process of claim 1, wherein said gas stream additionally contains moisture and said moisture is substantially completely adsorbed by said bed of activated alumina, and the gas used to purge said bed is substantially free of moisture.

3. The process of claim 2, wherein said gas stream is ambient air.

4. The process of claim 1, wherein the gaseous effluent from said bed of activated alumina is passed through a bed of zeolite and both of said beds are subsequently depressurized and purged with the gaseous effluent from said zeolite bed or with an other gas that is substantially free of carbon dioxide, thereby desorbing carbon dioxide from said beds.

5. A process in accordance with claim 1, wherein the particles of activated alumina in said bed are in the range of about 0.4 and 1.8 mm.

6. A process in accordance with claim 5, wherein said particles are between about 0.6 mm and 1.6 mm.

7. A process for the removal of water vapor and carbon dioxide from ambient air comprising repeating the sequential steps of:
   (a) flowing a stream of ambient air at a predetermined superatmospheric pressure through a bed of activated alumina, thereby adsorbing substantially all of the water vapor and carbon dioxide contained in said ambient air stream;
   (b) ceasing the flow of ambient air through said bed and venting said bed;
   (c) purging said bed with the gaseous effluent from step (a) or with an other gas which is substantially free of water vapor and carbon dioxide, thereby desorbing water vapor and carbon dioxide from said bed; and
   (d) repressurizing said bed to said predetermined superatmospheric pressure with a gas selected from the effluent from step (a) and ambient air.

8. The process of claim 7, wherein said bed is repressurized with the effluent from step (a) and the flow of gas in steps (b), (c) and (d) is countercurrent tot he flow of gas in step (a).

9. The process of claim 7, wherein step (d) comprises first partially pressurizing said bed with the effluent from step (a) and then further pressurizing said bed with ambient air.

10. The process of claim 7, wherein step (a) additionally comprises flowing the gaseous effluent from said bed of activated alumina through a bed of zeolite.

11. The process of claim 10, wherein the zeolite has an average particle size in the range of about 0.4 and 1.8 mm.

12. The process of claim 10, wherein the average particle side of the zeolite is in the range of about 0.6 mm and 1.6 mm.

13. The process of claim 10, wherein all adsorbent particles in said beds are between about 0.4 mm and 1.8 mm.

14. The process of claim 7, wherein the gaseous effluent from step (a) is fractionated in a cryogenic air separation unit.

15. The process of claim 14, wherein said other gas is a product gas from said cryogenic air separation unit.

16. The process of claim 14 wherein said other gas is a nitrogen-enriched waste stream from said cryogenic air separation unit.

17. A process for the removal of carbon dioxide from a gas stream comprising repeating the sequential steps of:
   (a) flowing the gas stream at a predetermined superatmospheric pressure through a bed of activated alumina, thereby adsorbing substantially all of the carbon dioxide contained in said gas stream;
   (b) ceasing the flow of said gas stream through said bed and venting said bed; and
   (c) purging said bed with the gaseous effluent from step (a) or with an other gas which is substantially free of carbon dioxide, thereby desorbing carbon dioxide from said bed; and
   (d) repressurizing said bed to said predetermined superatmospheric pressure with the effluent from step (a).

* * * * *